United States Patent
Tanizawa (10) Patent No.: US 8,985,674 B2
(45) Date of Patent: Mar. 24, 2015

(54) DOOR TRIM FOR VEHICLE (75) Inventor: Toshiya Tanizawa, Toyota (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 167 days.

(21) Appl. No.: 13/551,838

(22) Filed: Jul. 18, 2012

(65) Prior Publication Data

US 2013/0033066 A1 Feb. 7, 2013

(30) Foreign Application Priority Data

Aug. 2, 2011 (JP) .................................. 2011-169164
Aug. 2, 2011 (JP) .................................. 2011-169165

(51) Int. Cl.
*B60R 13/02* (2006.01)

(52) U.S. Cl.
CPC .................................. *B60R 13/0243* (2013.01)
USPC .................................................... 296/146.7

(58) Field of Classification Search
USPC ............... 296/146.1, 146.7, 152, 153; 49/502
See application file for complete search history.

(56) References Cited

U.S. PATENT DOCUMENTS

| | | | | |
|---|---|---|---|---|
| 5,095,659 A * | 3/1992 | Benoit et al. | ..................... | 49/502 |
| 5,577,794 A * | 11/1996 | Gandhi et al. | ............. | 296/146.6 |
| 6,092,858 A * | 7/2000 | Bolwell | ..................... | 296/146.7 |
| 6,149,224 A * | 11/2000 | Tiberia et al. | ............. | 296/146.7 |
| 6,170,199 B1 * | 1/2001 | Stenzel et al. | ................. | 49/502 |
| 6,318,783 B1 * | 11/2001 | Knox | ........................... | 296/39.1 |
| 6,409,250 B1 * | 6/2002 | Schultheiss | ................. | 296/146.7 |
| 6,438,899 B1 * | 8/2002 | Feder et al. | ..................... | 49/502 |
| 6,546,674 B1 * | 4/2003 | Emerling et al. | ............... | 49/502 |
| 6,615,546 B2 * | 9/2003 | Furuyama et al. | ............... | 49/502 |
| 6,616,216 B2 * | 9/2003 | Furuyama et al. | ......... | 296/146.7 |
| 6,672,650 B2 * | 1/2004 | Winget | ...................... | 296/146.7 |
| 6,722,725 B1 * | 4/2004 | Moral et al. | ................ | 296/146.7 |
| 6,857,688 B2 * | 2/2005 | Morrison et al. | .......... | 296/146.7 |
| 6,929,309 B1 * | 8/2005 | Radu et al. | ................. | 296/146.7 |
| 7,008,003 B1 * | 3/2006 | Hirose et al. | ................ | 296/146.7 |
| 7,051,438 B2 * | 5/2006 | O'Brien et al. | .............. | 29/897.2 |
| 7,108,313 B2 * | 9/2006 | Forrester et al. | ........... | 296/146.7 |
| 7,695,051 B2 * | 4/2010 | Abe | .......................... | 296/187.03 |
| 7,905,059 B2 * | 3/2011 | Senoo | .............................. | 49/503 |
| 7,971,923 B2 * | 7/2011 | Mazur et al. | ................ | 296/146.7 |

(Continued)

FOREIGN PATENT DOCUMENTS

| | | |
|---|---|---|
| JP | 9-118131 | 5/1997 |
| JP | 2007-190959 | 8/2007 |
| JP | 2008-184001 | 8/2008 |
| JP | 2010-173412 | 8/2010 |

OTHER PUBLICATIONS

Chinese Office Action, dated May 27, 2014, in corresponding Chinese Patent Application No. 201210272293.X, along with an English-language translation thereof.

(Continued)

*Primary Examiner* — Glenn Dayoan
*Assistant Examiner* — Paul Chenevert
(74) *Attorney, Agent, or Firm* — Greenblum & Bernstein, P.L.C.

(57) ABSTRACT

A door trim for a vehicle includes a front trim, a rear trim, and at least one trim component. The front trim is to be arranged closer to the front of the vehicle. The rear trim is to be arranged closer to a rear of the vehicle. The at least one trim component is mounted to the front trim and the rear trim so as to extend from the front trim to the rear trim across a boundary between the front trim and the rear trim.

19 Claims, 11 Drawing Sheets

(56) References Cited

U.S. PATENT DOCUMENTS

| | | | |
|---|---|---|---|
| 7,971,927 B2* | 7/2011 | Tomasu | 296/187.12 |
| 8,292,344 B2 | 10/2012 | Yamaguchi et al. | |
| 8,840,169 B2* | 9/2014 | Tanizawa | 296/146.7 |
| 2002/0047289 A1 | 4/2002 | Furuyama et al. | |
| 2003/0011209 A1* | 1/2003 | Berta et al. | 296/146.7 |
| 2003/0116993 A1* | 6/2003 | Skarb et al. | 296/146.7 |
| 2004/0155483 A1* | 8/2004 | Lin et al. | 296/146.1 |
| 2013/0181475 A1* | 7/2013 | Torii | 296/146.7 |

OTHER PUBLICATIONS

Japanese Official Action for Japanese Application No. 2011-169164, dated Jan. 8, 2015, along with an English-language translation thereof.

Japanese Official Action for Japanese Application No. 2011-169165, dated Jan. 8, 2015, along with an English-language translation thereof.

* cited by examiner

DOOR TRIM FOR VEHICLE

CROSS REFERENCE TO RELATED APPLICATION

This application claims priority from Japanese Patent Applications No. 2011-169164 and No. 2011-169165 both filed on Aug. 2, 2011. The entire content of this priority application is incorporated herein by reference.

FIELD OF THE INVENTION

The present disclosure relates to a door trim for a vehicle.

BACKGROUND OF THE INVENTION

A door trim mounted to a door of a vehicle disclosed in JP-A-H09-118131 Japanese Published Patent Application to Tsutumi Hisashi is known. The door trim includes a front trim and a rear trim provided as separate parts. Functional parts of the door are concentrated on the front trim. Because the door trim is divided into the front trim and the rear trim, sizes of forming dies can be reduced and the front trim can be used for a three-door vehicle or a five-door vehicle.

In comparison to a door trim provided as a single part, the rigidity of the door trim having the above configuration around a boundary between the front trim and the rear trim may decrease. The rigidity of the door trim around the boundary between the front trim and the rear trim needs to be increased without additional parts for reinforcement of the door trim.

SUMMARY OF THE INVENTION

The technology described herein has been made in view of the aforementioned circumstances. An objective of the technology is to provide a door trim including a front trim and a rear trim with sufficient rigidity around a boundary between the front trim and the rear trim without additional reinforcement parts.

A door trim according to an aspect of the present invention includes a front trim, a rear trim, and at least one trim component. The front trim is to be arranged close to the front of the vehicle. The rear trim is to be arranged closer to the rear of the vehicle. The at least one trim component is mounted to the front trim and the rear trim so as to extend from the front trim to the rear trim across a boundary between the front trim and the rear trim. Because the trim component is an existing component of the door trim, the rigidity of the door trim around the boundary between the front trim and the rear trim can be increased without an additional reinforcement part.

The trim component may include a front mounting portion for mounting a front portion of the trim component to the front trim and the rear mounting portion for mounting a rear portion of the trim component to the rear trim. With this configuration, the rigidity of the door trim around the boundary can be further increased.

The front trim and the rear trim may include overlapping portions arranged so as to overlap each other. The trim component may include a joint mounting portion in an area corresponding to the overlapping portions. The overlapping portions and the joint mounting portion may be aligned so as to overlap each other, and fixed.

Because the trim component is not only fixed to the front trim and the rear trim so as to extend across the boundary but also fixed to the overlapping portion, the rigidity is further increased.

One of the edges of the front trim connected to the rear trim may be a diagonal edge such that a top edge of the front trim is shorter than a bottom edge of the front trim. One of the edges of the rear trim connected to the diagonal edge of the front trim may be a diagonal edge such that a top edge of the rear trim is longer than the bottom edge of the rear trim.

The front trim and the rear trim may include door grip portions extending along the diagonal edges of the front trim and the rear trim. The grip portions may define a door grip. The trim component may be an ornament arranged so as to overlap the door grip portions from a vehicle exterior side. The ornament is mounted to the areas of the front trim and the rear trim in which the door grip is arranged. Stresses are more likely to concentrate in such areas. Because the ornament is mounted to the areas, not only the rigidity of the door trim is increased but also forces for holding the door grip to the front trim and the rear trim are increased.

The ornament may include a main body having a shallow tray-like shape, a projecting portion extending from a front edge of the main body, and flanges extending from the main body and the projecting portion, respectively. The flanges extending from the main body may include a front flange and a rear flange. The front mounting portion and the rear mounting portion of the ornament may be provided in the front flange and the rear flange, respectively. The joint mounting portion may be provided in the flange extending from the projecting portion. The rear trim may have an ornament mounting hole in which the main body of the ornament is fitted and a rear ornament mount base at a rear edge of the ornament mounting hole. The rear mounting portion of the ornament may be held against the rear ornament mount base and fixed. The front trim may have a front ornament mount base. The front mounting portion of the ornament may be held against the front ornament mount base and fixed. The joint mounting portion of the ornament may be held against the overlapping portion of the rear trim, and fixed.

The joint mounting portion may be arranged in a base portion of the door grip.

In the area around the boundary between the front trim and the rear trim, external forces or stresses are more likely to concentrate around the base portion of the door grip. Therefore, the rigidity of the door trim around the door grip needs to be increased. According to the technology described herein, the overlapping portions are aligned so as to overlap each other and are arranged in the base portion of the door grip. The joint mounting portion of the ornament is arranged on the overlapping portions. The base portion of the door grip is reinforced by the overlapping portions and the joint mounting portion that are aligned so as to overlap each other. With this configuration, not only the rigidity of the door trim around the boundary between the front trim and the rear trim is increased but also the forced for holding the door grip to the trims can be increased.

The front trim, the rear trim, and the ornament may include armrest portions defining an armrest. The armrest may include a step projecting to the vehicle interior side. With this configuration, the door trim can tolerate external forces applied thereto from the vehicle interior side. The armrest may have an arm placement portion extending in the front-rear direction of the vehicle so that an occupant of the vehicle places his or her arm on the arm placement surface. When the front trim, the rear trim, and the ornament are assembled together, they define the step of the armrest including the arm placement surface. Namely, each of the front trim, the rear trim, and the ornament includes a portion of the step of the armrest. In comparison to the door trim having a flat surface or a surface without a step, stresses applied to the door trim from the vehicle interior side are less likely to concentrate. With the step, the stresses are effectively spread. With this configuration including the step, the overall rigidity of the door trim can be increased. Moreover, the stresses applied to a boundary area of the door trim around the boundary between the front trim and the rear trim can be reduced. Therefore, the rigidity of the door trim in the boundary area can be effectively increased.

According to the technology described herein, in the door trim including the front trim and the rear trim, the strength of the door trim around the boundary between the front trim and the rear trim can be increased without additional parts for the reinforcement.

DETAILED DESCRIPTION OF THE PREFERRED EMBODIMENTS

Figure 1:
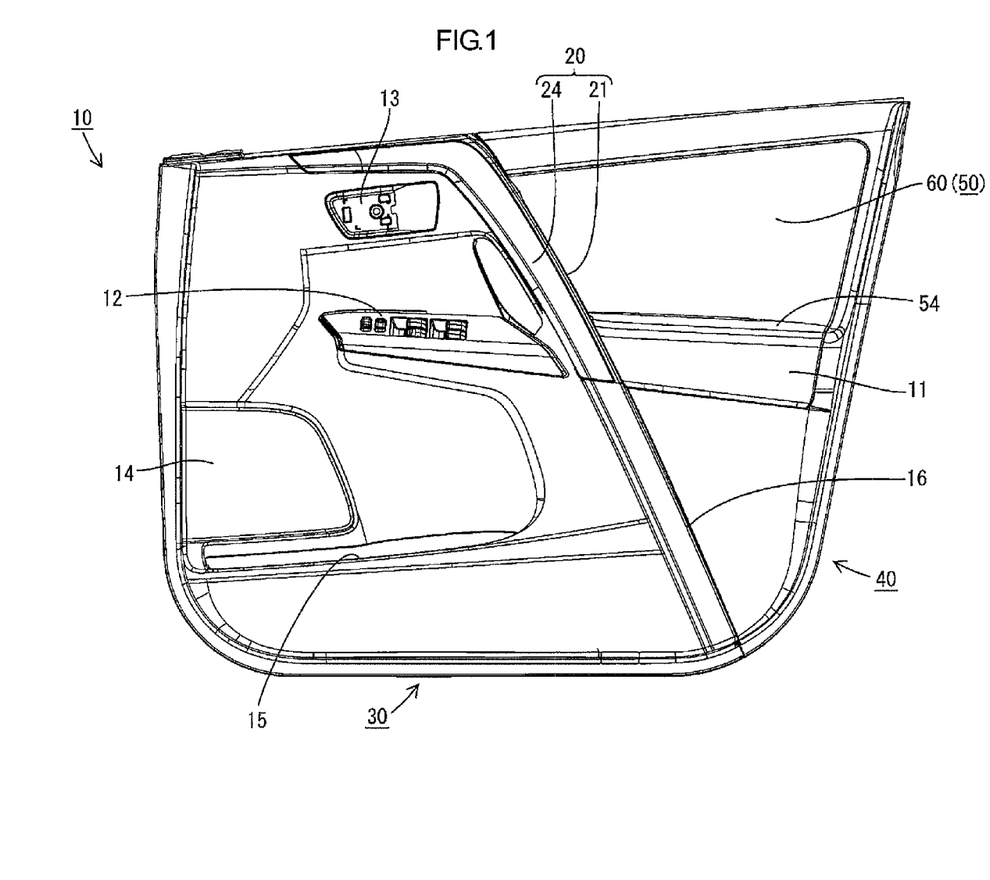
FIG. 1 is a view of an interior side of a door trim according to an embodiment.

An embodiment will be explained with reference to FIGS. 1 to 11. A door trim 10 is a vehicular interior part for a vehicle door mounted on an interior surface of a vehicle inner door panel (or a vehicle body). A door grip 20 is provided around the middle of the front-rear dimension of the door trim 10. In FIG. 1, the horizontal direction and the depth direction of the door trim 10 correspond the front-rear direction and the width direction of the vehicle, respectively.

The trim board 10 includes three main components, a front trim 30, a rear trim 40, and an ornament 50. Bases of the main components are made of synthetic resin such as polypropylene or synthetic resin material with wood-based material mixed. The wood-based material may be kenaf. As illustrated in FIG. 1, the door trim 10 includes an armrest 11 projecting to the vehicle interior side and extending from the front-rear direction of the vehicle. The armrest 11 may be arranged about the center for the door trim 10. The armrest 11 has a switch panel mounting hole 12A (see FIG. 2) in a front portion. A switch panel 12 is fitted in the switch panel mounting hole 12A. The front trim 30 has an inside handle mounting hole 13 above the switch panel 12. Furthermore, the front trim 30 has a speaker grill 14 and a door pocket portion 15 below the switch panel 12.

The door trim 10 has a dividing line 16 (a boundary) between the front trim 30 and the rear trim 40 on the vehicle interior side. The dividing line 16 is a diagonal substantially straight line extending from about the midpoint of the upper edge of the door trim 10 to a point of the lower edge of the door trim 10 closer to the rear edge thereof. Namely, one of edges of the front trim 30 connected to the rear trim 40 and one of the edges of the rear trim 40 connected to the front trim 30 are diagonal edges. The diagonal edge of the front trim 30 is formed such that the top edge is shorter than the bottom edge. The diagonal edge of the rear trim 40 is formed such that the top edge is longer than the bottom edge. If the front trim 30 and the rear trim 40 are provided in different colors, the door trim 10 has two different color sections on the respective sides of the dividing line 16. Namely, the door trim 10 has a designed appearance.

The door grip 20 is provided along the dividing line 16. The front trim 30 and the rear trim 40 include door grip portions that extend along the diagonal edges of the front trim 30 and the rear trim 40. The door grip portions define the door grip 30 when the front trim 30 and the rear trim 40 are assembled. The door grip 20 is arranged in the upper portion of the door trim 10. The door grip 20 extends over around the middle portion of the armrest 11. The door grip 20 includes a grip base 21 and a grip cover 24 that is attached to the grip base 21 from the vehicle interior side. The ornament 50 is attached to areas of the front trim 30 and the rear trim 40 above the armrest 11 so as to cover a surface of the door grim 20 on the vehicle exterior side. A surface of the ornament 50 on the vehicle interior side is covered with a skin 60. A material of the skin 60 may be selected from (synthetic) resin, (synthetic) leather, and textile.

Figure 2:
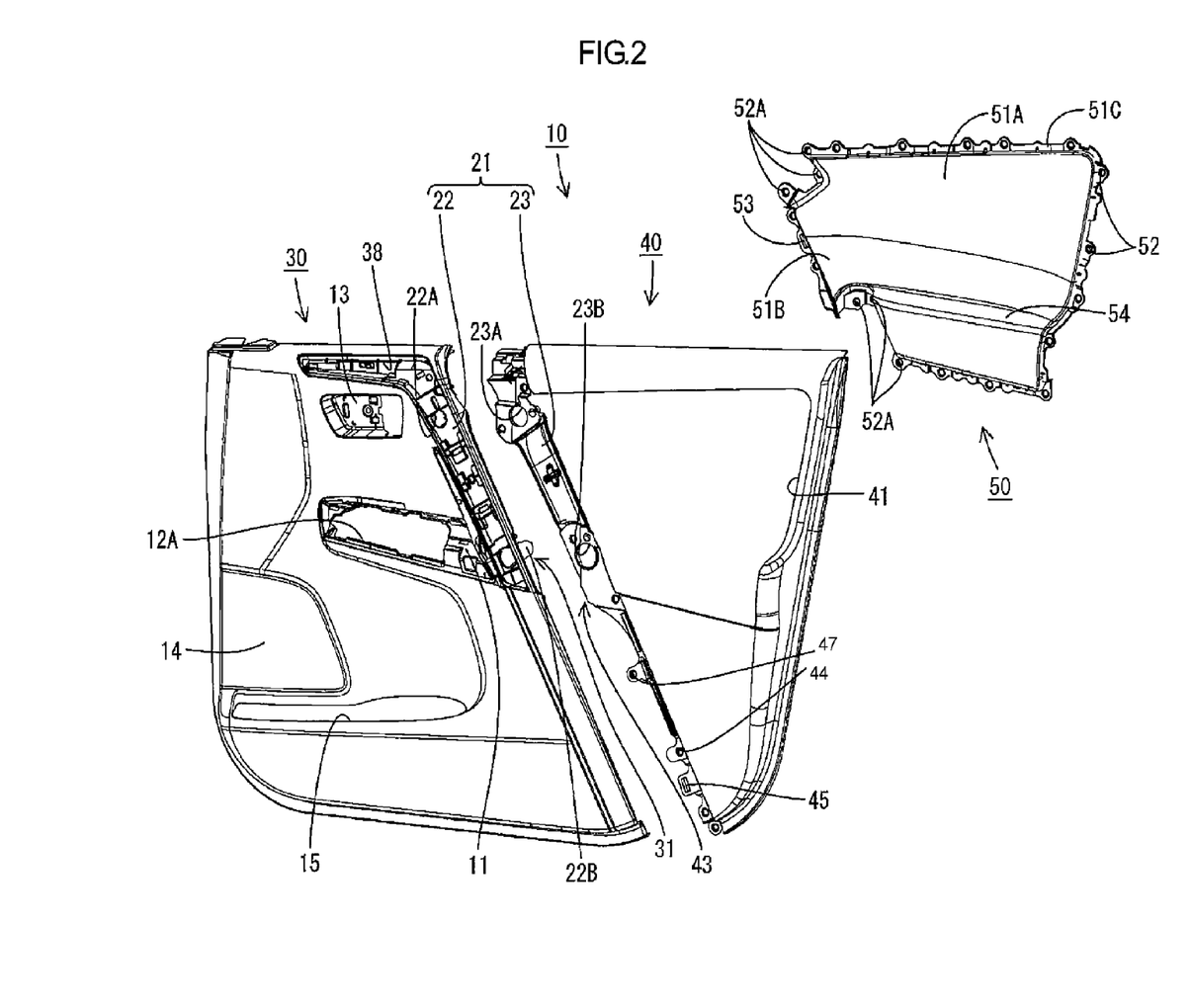
FIG. 2 is a view of relevant components of the door trim.
Figure 3:
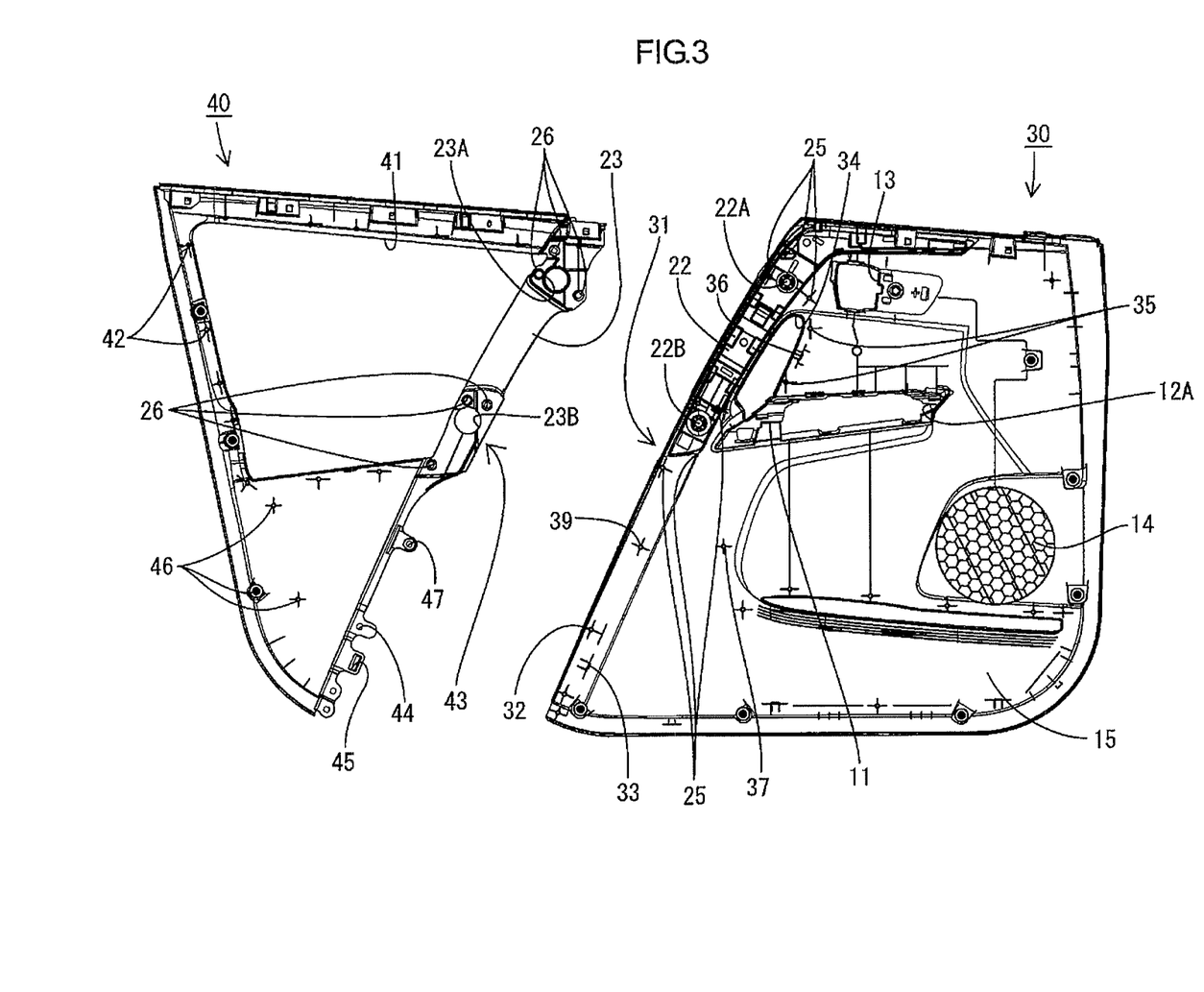
FIG. 3 is a view of interior sides of a front trim and a rear trim of the door trim.

Next, the components of the door trim 10 will be explained. As illustrated in FIG. 2, the front trim 30 is a front component of the door trim 10. The rear portion of the front trim 30 is a mount base 31 and the front portion of the rear trim 40 is a mounting portion 43, which will be explained later. The mount base 31 and the mounting portion 43 are overlapping portions that overlap each other when the front trim 30 and the rear trim 40 are assembled.

Specifically, round rear trim mounting posts 32 and a plate-like rear trim latch 33 project from the surface of the front trim 30 on the vehicle exterior side. A band-like area of the mount base 31 above the armrest 11 is a first mount base section 22. The first mount base section 22 is a vehicle-interior-side portion of the door grip base 21 of the door grip 20. The rear trim 40 has a first mounting section 23. The first mount base section 22 and the first mounting section 23 are provided as a pair. The first mount base section 22 and the first mounting section 23 form the door grip base 21 when they are assembled. The door grip base 21 is a hollow component. The front trim 30 has a hole 34 in an area more to the front of the vehicle than the first mount base part 22. With the hole 34, the first mount base section 22 integrally provided with the front trim 30 is formed as a grip. The front trim 30 includes a front ornament mounting base at the rear edge of the hole 34. Front ornament mounting posts 35 and an ornament latch 36 are arranged on the front ornament mounting base more to the front of the vehicle than the front edge of the hole 34. The front ornament mounting posts 35 and the ornament latch 36 have similar configurations as the rear trim mounting posts 32 and the rear trim latch 33, respectively.

The rear trim 40 is a rear component of the door trim 10. The rear trim 40 has an ornament mounting hole 41 in an upper area thereof for mounting the ornament 50 from the vehicle exterior side. The rear trim 40 includes a rear ornament mount base at the rear edge of the ornament mounting hole 41. Round rear ornament mounting posts 42 are arranged on the rear ornament mount base along edges of the ornament mounting hole 41. A main body ornament 50, which will be explained later, is fitted in the ornament mounting hole 41.

The front end of the rear trim 40 is the mounting portion 43 that is arranged so as to overlap the mount base 31 and mounted to the mount base 31. The mounting portion 43 has insertion holes 44 and a rear trim latch hole 45 in areas corresponding to the rear trim mounting posts 32 and the rear trim latch 33 of the mount base 31. The mounting portion 43 includes the band-like first mounting section 23 on a side of the ornament mounting hole 41. The first mounting section 23 is the vehicle-exterior-side portion of the grip base 21 of the door grip 20.

Figure 4:
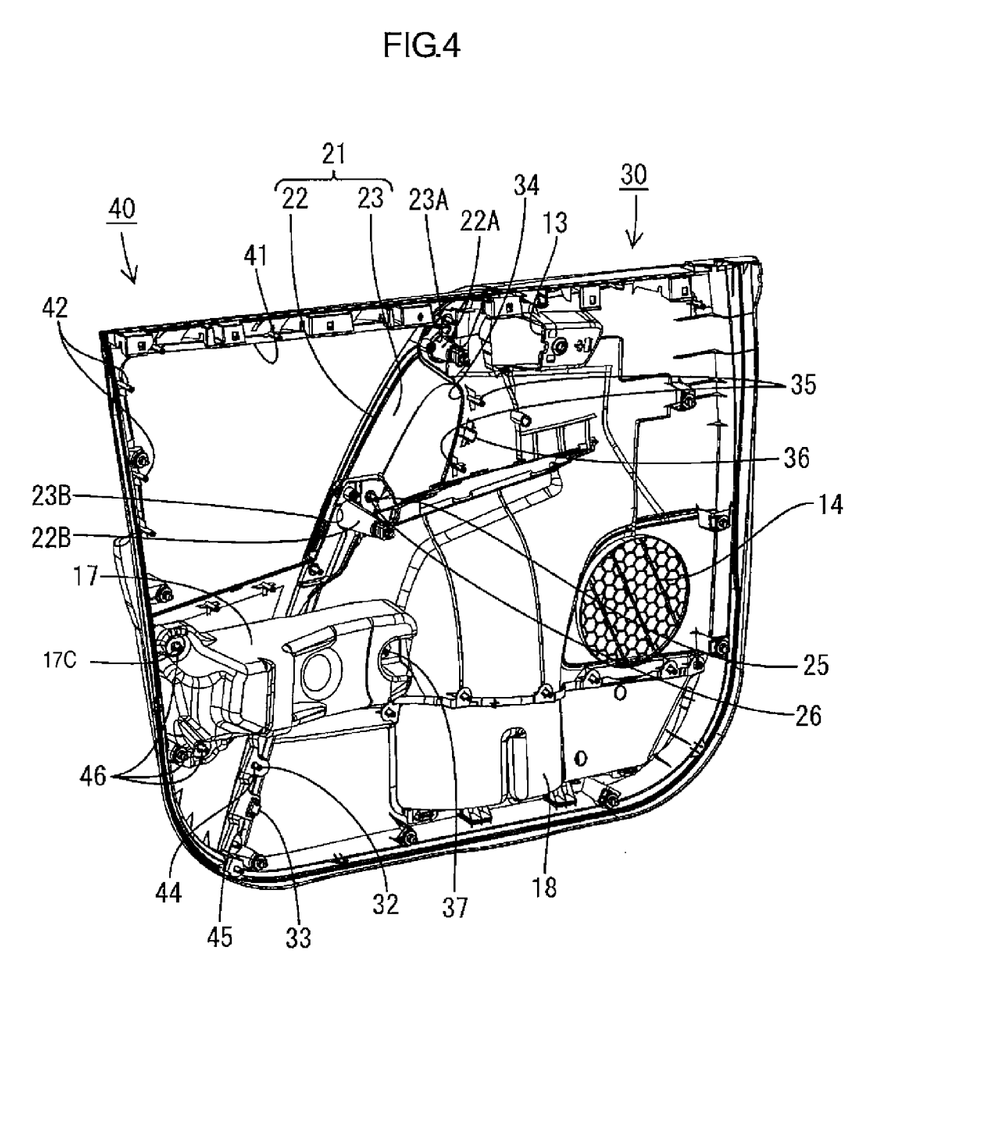
FIG. 4 is a perspective view of the door trim including the assembled front trim and the rear trim viewed from the inside of the vehicle.

The front trim 30 and the rear trim 40 are assembled as in FIG. 4. How the front trim 30 and the rear trim 40 are engaged around the door grip 20 will be explained later in detail. The rear trim mounting posts 32 of the front trim 30 are passed through the insertion holes 44 and the rear trim latch 33 is fitted in the rear trim latch hole 45. As a result, the mount base 31 and the mounting portion 43 are overlapped with each other. After the rear trim mounting posts 32 are passed through the insertion holes 44, the distal ends thereof are welded by ultrasonic welding or some other welding method. As a result, the mounting portion 43 of the rear trim 40 is fixed to the mount base 31 of the front trim 30.

Figure 5:
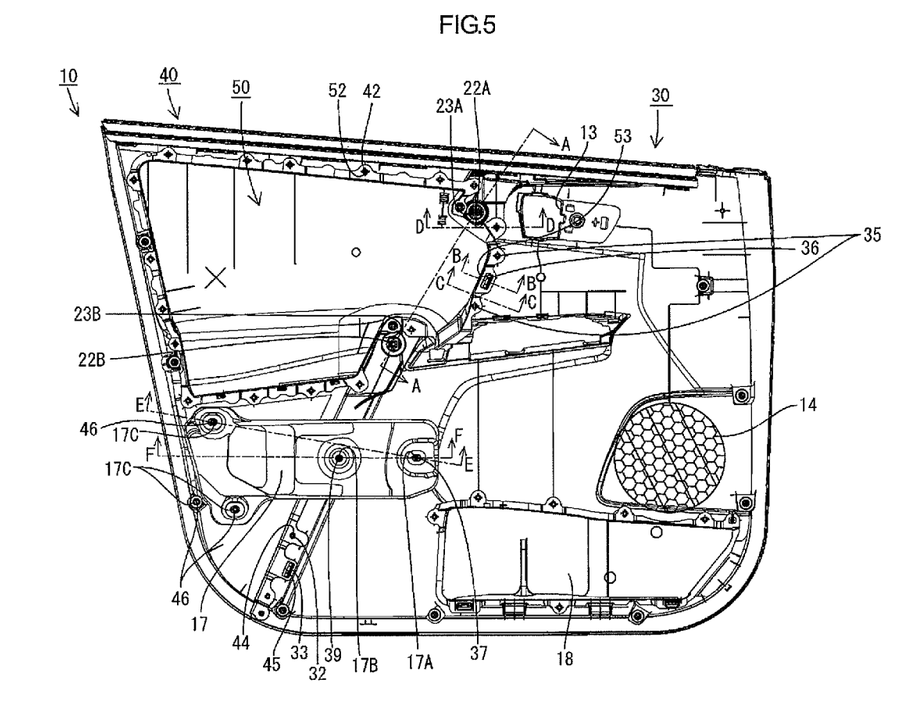
FIG. 5 is a view of an exterior side of the door trim.

After the front trim 30 and the rear trim 40 are fixed together, an impact absorber 17 and a pocket base 18 are mounted to the vehicle-exterior-side surfaces of the front trim 30 and the rear trim 40 as illustrated in FIGS. 4 and 5.

The impact absorber 17 is a so-called energy absorption (EA) pad provided by forming a rigid polyurethane foam into a block-like shape. The impact absorber 17 absorbs an impact from the side of the vehicle to reduce the impact on an occupant beside the door trim 10. As illustrated in FIG. 5, the impact absorber 17 has a substantially rectangular shape so as to extend in the front-rear direction of the vehicle when the trim 10 is mounted to the door panel. The impact absorber 17 is arranged in areas of the front trim 30 and the rear trim 40 in which the door grip portions are not arranged. Namely, the impact absorber 17 is arranged under the ornament 50 and across the boundary between the front trim 30 and the rear trim 40. The impact absorber 17 is mounted to the front trim 30 and the rear trim 40 so as to extend from the front trim 30 to the rear trim 40 across the boundary between the front trim 30 and the rear trim 40.

Impact absorber mounting posts 37, 39 and 46 are provided for mounting the impact absorber 17. The front impact absorber mounting post 37 is a round post projecting from the vehicle-exterior-side surface of the front trim 30. The joint mounting post 39 is a round post projecting from the mount base 31 of the front trim 30. The mounting portion 43 of the rear trim 40 has a joint mounting hole 47 at a location corresponding to the joint mounting post 39. When the rear trim 40 is mounted to the front trim 30, the joint mounting post 39 is in the joint mounting hole 47. Three rear impact absorber mounting posts 46 project from the rear trim 40. Each rear impact absorber mounting posts 46 has a dram-like shape.

The impact absorber 17 has through holes. Specifically, the impact absorber 17 has a front mounting hole 17A in the front part thereof. The front impact absorber mounting post 37 is inserted in the front mounting hole 17A. The impact absorber 17 includes a joint mounting portion in the middle portion thereof. The joint mounting portion has a joint mounting hole 17B. The joint mounting post 39 inserted in the joint mounting hole 47 is further inserted in the joint mounting hole 17B. The impact absorber 17 has rear mounting holes 17C in the rear part thereof at locations corresponding to the rear impact absorber mounting posts 46. The rear impact absorber mounting posts 46 are inserted in the respective rear mounting holes 17C.

The front impact absorber mounting post 37 is inserted in the front mounting hole 17A. The joint mounting post 39 inserted in the joint mounting hole 47 is inserted in the joint mounting hole 17B. The rear impact absorber mounting posts 46 are inserted in the rear mounting holes 17C. After the mounting posts 37, 39 and 46 are inserted in the respective holes 17A, 17B and 17C, the distal ends thereof are welded by ultrasonic welding or some other welding method. As a result, the impact absorber 17 is fixed to the front trim 30 and the rear trim 40 (see FIGS. 10 and 11).

The impact absorber 17 is mounted to the front trim 30 and the rear trim 40 so as to extend across the boundary therebetween. The impact absorber 17 functions not only as an impact absorber for reducing a side impact on the occupant but also reinforcements for increasing the rigidity of the boundary portion of the door trim 10 around the boundary between the front trim 30 and the rear trim 40. Because the impact absorber 17 is an existing component of the door trim 10, an additional part is not required for the reinforcements of the boundary portion of the door trim 10.

The impact absorber 17 has the front mounting hole 17A for mounting the front portion thereof to the front trim and the rear mounting holes 17C for mounting the rear portion thereof to the rear trim 40. By increasing the forces for holding the impact absorber 17 to the front trim 30 and the rear trim 40, the rigidity of the boundary portion of the door trim 10 can be effectively increased.

The overlapping portion in which the front trim 30 and the rear trim 40 overlap each other includes the mount base 31 and the mounting portion 43, respectively. The impact absorber 17 is arranged such that a portion thereof is placed over the overlapping portion of the door trim 10. The joint mounting hole 17B is provided in the portion that is placed over the overlapping portion. This portion of the impact absorber 17 is a fixing point thereof to the front trim 30 and the rear trim 40. Namely, the impact absorber 17, the front trim 30, and the rear trim 40 are fixed together with the joint mounting post 39, the joint mounting hole 47, and the joint mounting hole 17B aligned. This increases the forces for holding the impact absorber 17 to the front trim 30 and the rear trim 40 in comparison to the configuration in which only the end portions the impact absorber 17 are fixed to the front trim 30 and the rear trim 40.

The pocket base 18 is made of the same synthetic resin as the front trim 30 and the rear trim 40 and mounted to the front trim 30 so as to cover the door pocket portion 15 from the vehicle exterior side. As a result, a door pocket that opens to the vehicle interior is defined.

As illustrated in FIG. 2, the ornament 50 includes the main body 51A, a projecting portion 51B, and flanges 51C. The main body 51A has a shallow tray-like shape. The projecting portion 51B extends from the front edge of the main body 51A. The flanges 51C extend outward from edges of the main body 51A and the projecting portion 51B, respectively. The flanges 51C include a front flange (a front mounting portion) and a rear flange (a rear mounting portion). The front and the rear flanges 51C of the ornament 50 have ornament insertion holes 52. The front flange 51C further includes an ornament latch hole 53. The flanges 51C that extend from the projecting portion 51B are in joint mounting portions corresponding to base portions 20B of the door grip 20. The ornament insertion holes 52 in the joint mounting portions are classified as first joint mounting post insertion holes 52A.

The vehicle-interior side surface of the main body 51A of the ornament 50 is covered with the skin 60 (see FIG. 5). The main body 51A is fitted in the ornament mounting hole 41. The front and the rear flanges 51C are held against the front ornament mount base and the rear ornament mount base, respectively. The flanges extending from the sides of the projecting portion 51B of the ornament 50 (a joint mounting portion) is held against the overlapping portion of the rear trim 40. The ornament 50 is fixed to the vehicle-exterior-side surfaces of the front trim 30 and the rear trim 40. Specifically, the front ornament mounting posts 35 are passed through the respective ornament insertion holes 52 (in the front mounting portion), and the ornament latch 36 is fitted in the ornament latch hole 53 (in the front mounting portion). The rear ornament mounting posts 42 are passed through the respective ornament insertion holes 52 (in the rear mounting portion).

Joint mounting posts 25 are provided in the first mount base section 22. Second joint mounting post insertion holes 26 are provided in the first mounting section 23. The joint mounting posts 25 are passed through the second insertion holes 26 and then passed through the first insertion holes 52A (in the mounting portion) of the ornament 50.

The ornament mounting posts 35 and 42 and the joint mounting posts 25 are passed through the respective ornament insertion holes 52 and the first insertion holes 52A. Then, the distal ends of the ornament mounting posts 35 and 42 and the joint mounting posts 25 are welded by ultrasonic welding or some other welding method, similar to the rear trim mounting posts 32. As a result, the ornament 50 is fixed to the front trim 30 and the rear trim 40. The edges of the skin 60 are held between the ornament 50 and the front trim 30 or the rear trim 40.

The ornament 50 mounted to the front trim 30 and the rear trim 40 is located on the vehicle exterior side, which is more toward the outer side than the door grip 20. Namely, the ornament 50 covers the hole 34 of the front trim 30 from the vehicle exterior side. The interior-side surface of the ornament 50 is an opposed surface with respect to the door grip 20. Furthermore, the ornament 50 is mounted to the edges of the ornament mounting hole 41 of the rear trim 40. The ornament 50 and the skin 60 that covers the interior surface of the ornament 50 on the vehicle interior side form a design surface of the door trim 10. The main body 51 of the ornament 50 has a step projecting to the vehicle interior side. The top surface of the step (facing toward the ceiling of the vehicle) is an arm placement surface 54 (an arm placement portion) of the armrest 11 on which an occupant places his or her arm. The arm placement surface 54 is within a portion of the ornament 50 attached to the rear trim 40.

Figure 6:
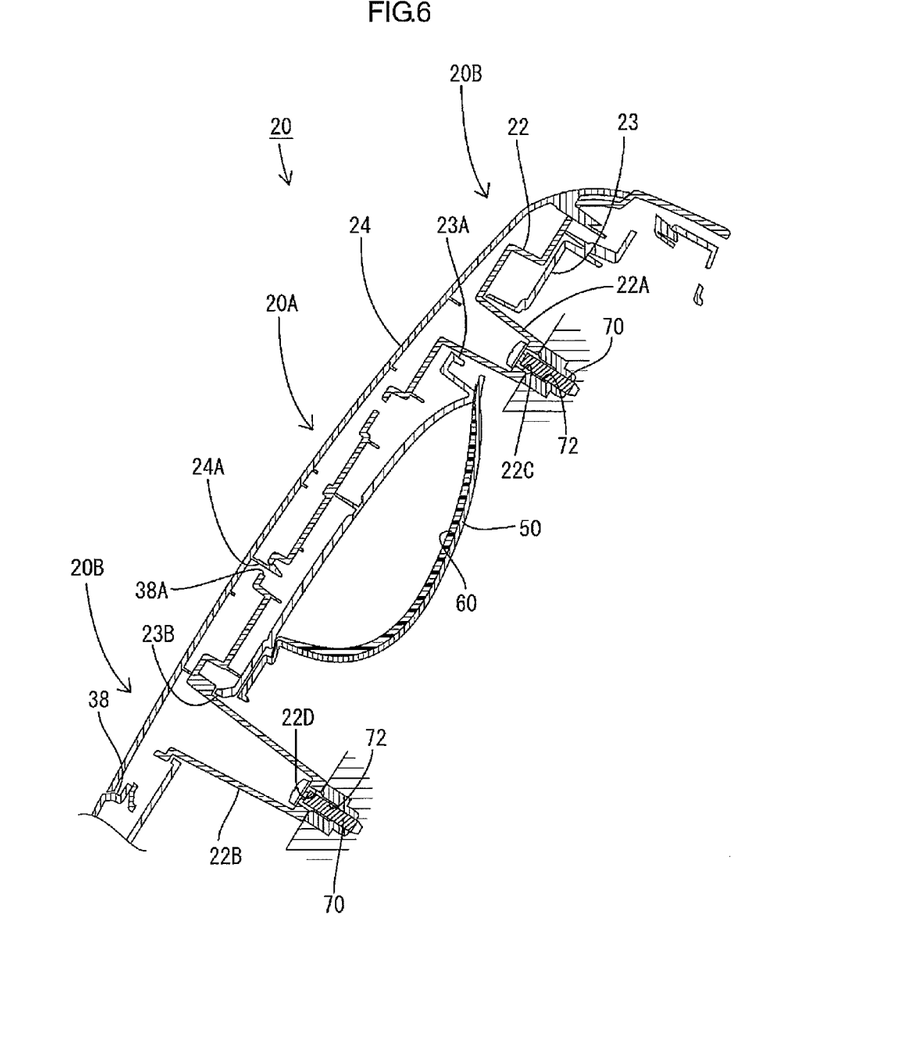
FIG. 6 is a cross-sectional view of the door trim along line A-A in FIG. 5.

Next, the configuration of the door grip 20 and the mounting structure thereof will be explained in detail with reference to FIGS. 6 to 9. As illustrated in FIG. 6, the door grip 20 includes a grip portion 20A and the base portions 20B. The occupant can hold the grip portion 20A from the vehicle interior side. The base portions 20B are bases of the door grip 20 arranged at the respective ends of the grip portion 20A. The first mount base section 22 includes round upper mounting boss 22A and lower mounting boss 22B with distal ends that slightly narrow toward the vehicle exterior side. The upper mounting boss 22A and the lower mounting boss 22B are located in the grip base portions 20B. The mounting bosses 22A and 22B have screw holes 22C and 22D, respectively, in the distal ends thereof. Screws 70 pass through screw holes 22C and 22D and are respectively screwed into mounting holes 72. The joint mounting posts 25 similar to the rear trim mounting posts 32 project from the peripheries of the mounting bosses 22A and 22B.

The first mounting section 23 has a round upper through hole 23A and a round lower through hole 23B at locations corresponding to the upper mounting boss 22A and the lower mounting boss 22B, respectively. The upper mounting boss 22A and the lower mounting boss 22B are passed through the upper through hole 23A and the lower through hole 23B, respectively. In the areas around the through holes 23A and 23B corresponding to the joint mounting posts 25, second joint mounting post holes 26 are provided. The joint mounting posts 25 are passed through the second joint mounting post holes 26.

Figure 7:
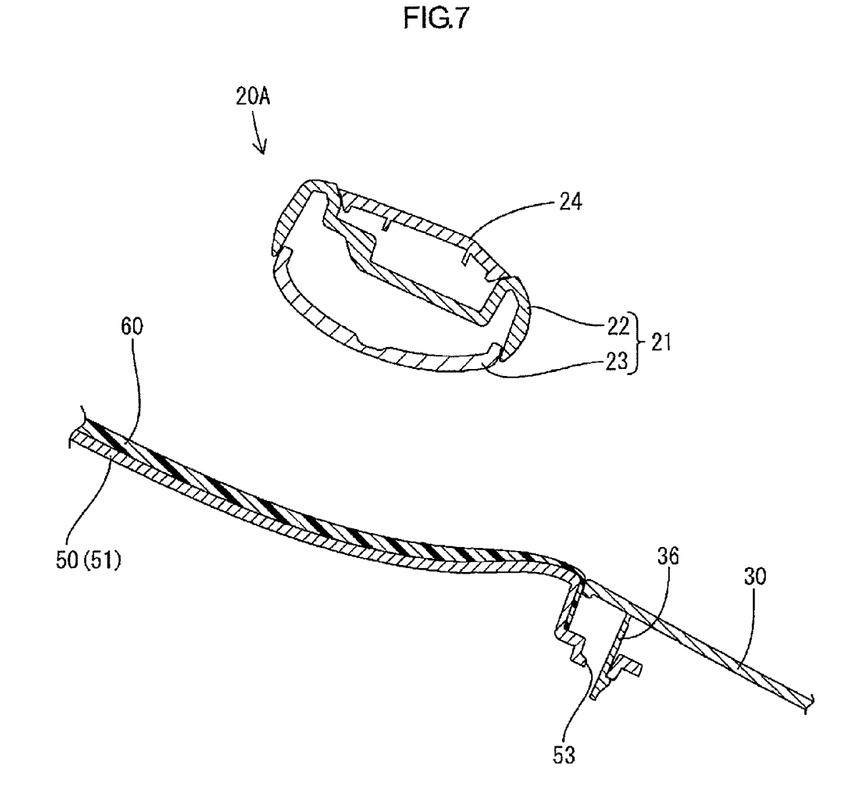
FIG. 7 is a cross-sectional view of the door trim along line B-B in FIG. 5.
Figure 8:
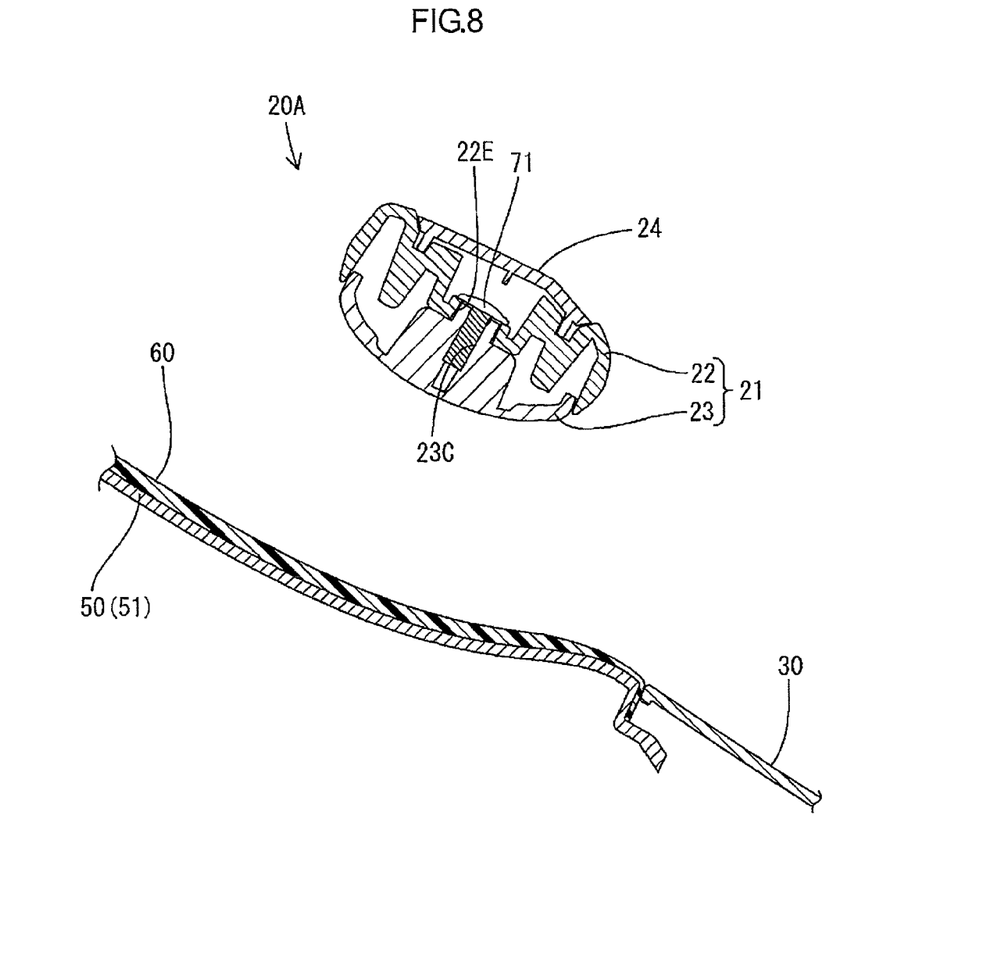
FIG. 8 is a cross-sectional view of the door trim along line C-C in FIG. 5.

The first mount base section 22 is placed over the first mounting section 23 when the mounting bosses 22A and 22B are inserted into the through holes 23A and 23B, and the joint mounting posts 25 are inserted in the respective second joint mounting post holes 26 (see FIGS. 4 and 6). As illustrated in FIG. 8, a screw 71 is passed through a screw insertion hole 22E in the first mount base section 22 and screwed into a screw hole 23C in the first mounting section 23. As a result, the first mount base section 22 and the first mounting section 23 are fixed together with the screw 71. The boundaries (or dividing areas) between the first mount base section 22 and the first mounting section 23, which are parts of the grip base 21, are located on sides toward the front and the rear of the vehicle as illustrated in FIGS. 7 and 8. Therefore, they are less likely to be viewed and thus the improved appearance can be provided.

Figure 9:
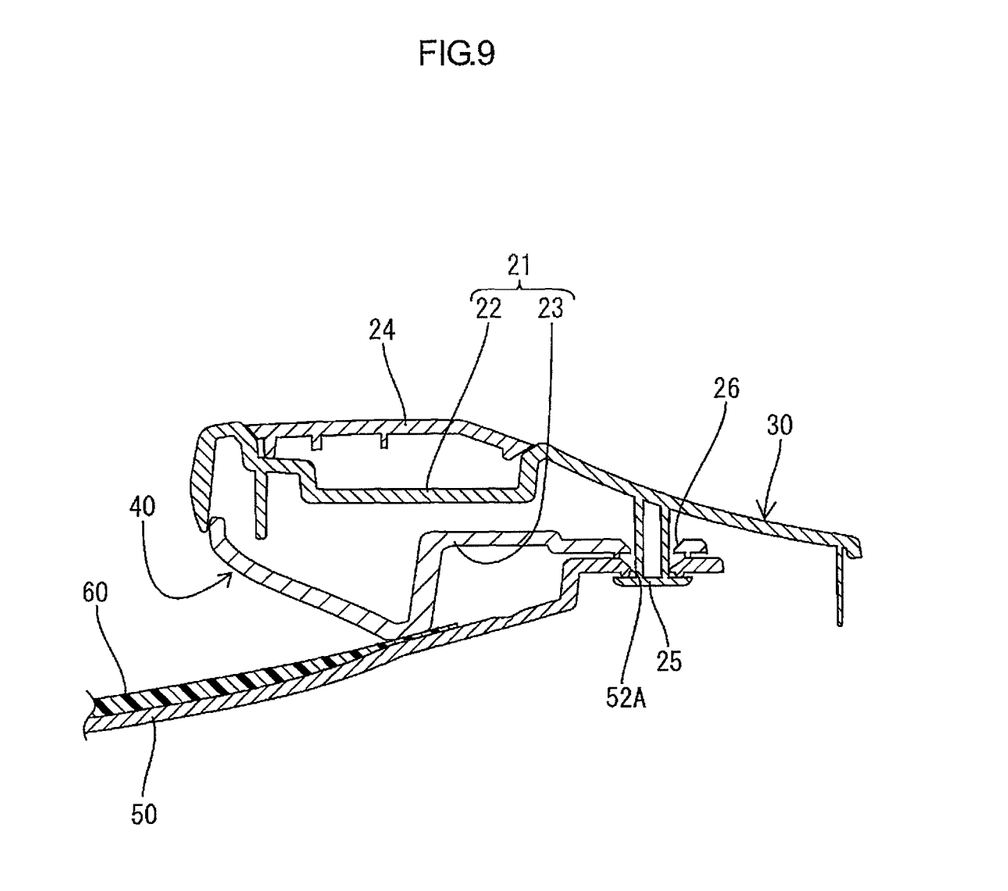
FIG. 9 is a cross-sectional view of the door trim along line D-D in FIG. 5.
Figure 10:
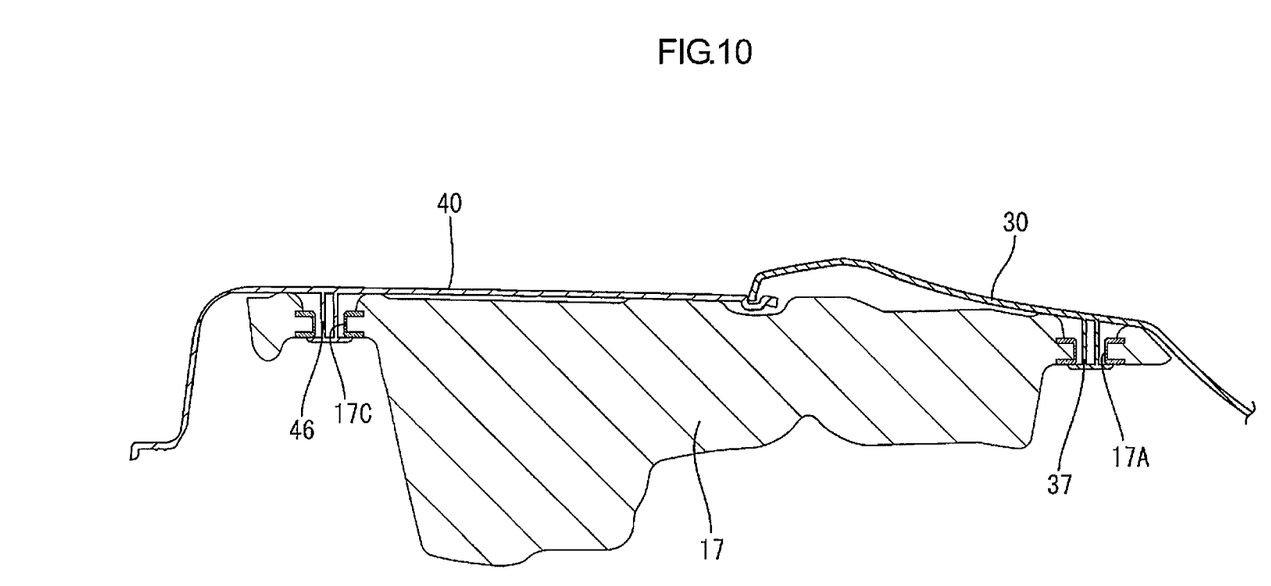
FIG. 10 is a cross-sectional view of the door trim along line E-E in FIG. 5.
Figure 11:
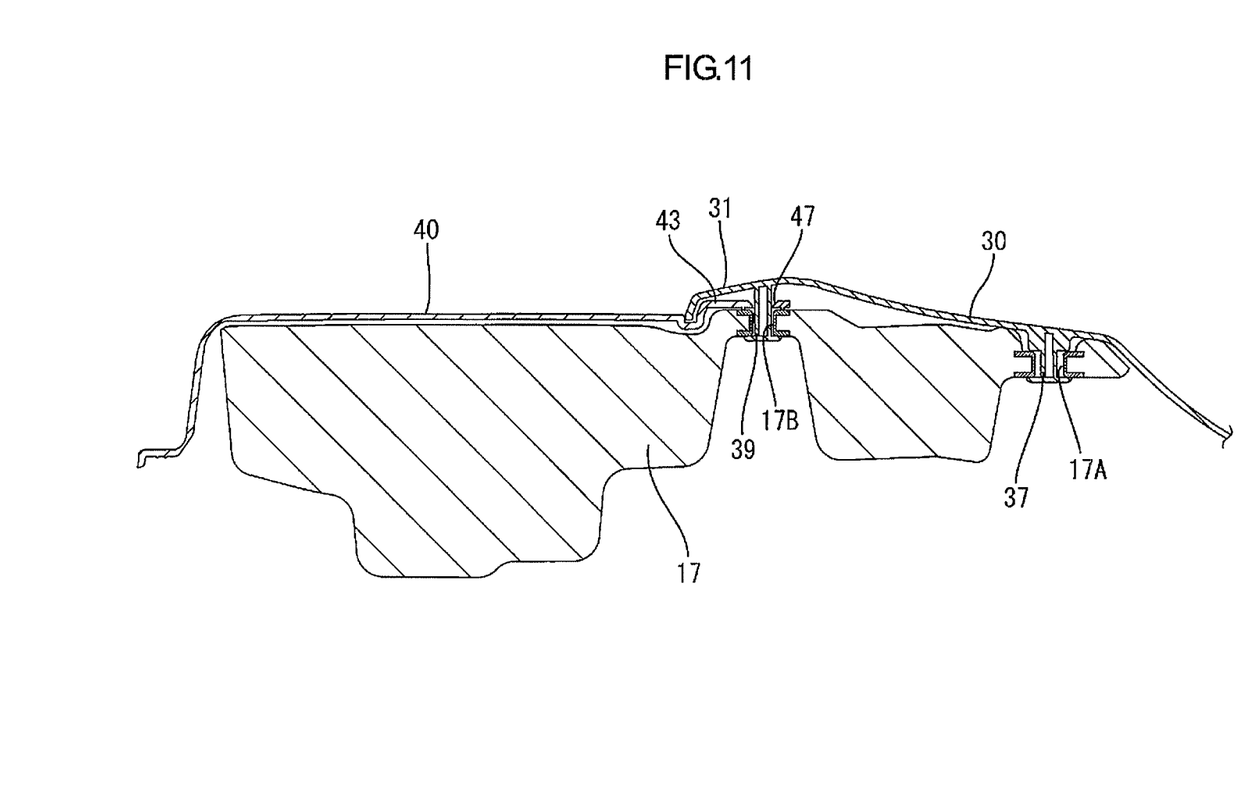
FIG. 11 is a cross-sectional view of the door trim along line F-F in FIG. 5.

As illustrated in FIG. 9, the joint mounting post 25 that is passed through the second joint mounting post hole 26 is passed through the first insertion hole 52A of the ornament 50. Then, the distal end of the joint mounting post 25 is welded by ultrasonic welding or some other welding method. As a result, the front trim 30, the rear trim 40, and the ornament 50 are overlapped with each other and fixed in the base portions 20B of the door grip 20. In the base portions 20B of the door grip 20, the front trim 30, the rear trim 40, and the ornament 50 are fixed together at several points. This improves the rigidity of the grip base 20B.

As illustrated in FIG. 6, the grip cover 24 is mounted to the grip base 21 on the vehicle interior side. As illustrated in FIG. 2, the front trim 30 includes a cover attachment section 38 that extends from the first mount base section 22 to the top portion. The cover attachment section 38 is recessed to the vehicle exterior side. The grip cover 24 is fitted in the cover attachment section 38. Grip cover latches 24A project from the vehicle-exterior-side surface opposite from a design surface of the grip cover 24 (i.e., the vehicle-interior-side surface). In the cover attachment section 38, fixing holes 38A are provided in areas corresponding to the grip cover latches 24A. The grip cover latches 24A are held to the edges of the fixing holes 38A. As a result, the grip cover is attached and held to the cover attachment section 38.

The door grip 20 arranged in the boundary portion of trim 10 is fixed to a door inner panel (not illustrated). As illustrated in FIG. 6, the screws 70 inserted in the screw hole 22C and the screw hole 22D of the mounting bosses 22A, 22B, respectively, are tightened into the mounting holes 72 of the door inner panel. As a result, the door grip 20 is fixed. The base portions 20B of the door grip 20 are fixed to the door inner panel, respectively. Although the door grip 20 is integrally provided with the front trim 30 and the rear trim 40, the door grip 20 still has a proper level of rigidity.

In this embodiment, the ornament 50 that is an existing part of the door trim 10 is mounted to the front trim 30 and the rear trim 40 so as to extend from the front trim 30 to the rear trim 40 across the boundary therebetween. Namely, the boundary portion of the door trim 10 can have increased rigidity without an additional reinforcement part.

The configuration in which the ornament 50 is mounted to the front trim 30 and the rear trim 40 so as to extend from the front trim 30 to the rear trim 40 across the boundary also provides a good appearance while the advantage of the door trim 10 constructed of multiple parts is maintained. The advantage of the door trim 10 includes a reduced die cost.

The ornament 50 has the ornament through holes 52 that are included in the front mounting portion and the rear mounting portion. The front mounting portion and the rear mounting portion are mounted to the front trim 30 and the rear trim 40, respectively. The ornament 50 is mounted to both the front trim 30 and the rear trim 40. Therefore, the rigidity of the boundary portion of the door trim 10, where the mounting portion 43 is mounted to the mount base 31, is more effectively increased.

The ornament 50 is mounted to the portions of the front trim 30 and the rear trim 40 around the door grip 20 to which stresses are more likely to be applied. This increases not only the rigidity of the boundary portion of the door trim 10 but also the force for holding the door grip 20 to the front trim 30 and the rear trim 40.

The overlapping portions of the front trim 30 and the rear trim 40 include the mount base 31 and the mounting portion 43. The ornament 50 is mounted to the front trim 30 and the rear trim 40 so as to extend from the front trim 30 to the rear trim 40 across the boundary therebetween. Furthermore, each joint mounting post 25 of the front trim 30 in the overlapping portion is passed through both the second joint mounting post hole 26 and the first insertion hole 52A and tightened. Therefore, the rigidity of the overlapping portion, that is, the boundary portion of the door trim 10 is further increased.

The door grip 20 is arranged in the boundary portion of the door trim 10. The rigidity of the base portions of the door grip 20 needs to be increased because external forces are applied thereto at the highest level. The first insertion holes 52A are provided in the base portions 20B of the door grip 20. As described above, the joint mounting posts 25 are passed through the respective first insertion holes 52A and the respective second joint mounting post holes 26 and fixed. Therefore, the base portions 20B are reinforced by the front trim 30, the rear trim 40, and the ornament 50. With this configuration, not only is the rigidity of the boundary portion of the door trim 10 increased but also the force for holding the door grip 20 to the front trim 30 and the rear trim 40 increases.

The front trim 30, the rear trim 40, and the ornament 50 include armrest portions that define the armrest 11 when the front trim 30, the rear trim 40, and the ornament 50 are assembled. The armrest 11 includes the step projecting to the vehicle interior side. With this configuration, the door trim 10 can tolerate the stress applied thereto from the vehicle interior side. The armrest 11 has the arm placement surface 54 that extends in the front-rear direction of the vehicle. The step with the arm placement surface 54 and the base of the armrest 11 is defined by the front trim 30, the rear trim 40, and the ornament 50. In comparison to a flat door trim, forces applied from the vehicle interior side are less likely to concentrate, that is, stresses that are applied to the door trim 10 can be effectively spread. With the step, the overall rigidity of the door trim 10 increases. Furthermore, the stress applied to the boundary portion including the mount base 31 and the mounting portion 43 is less likely to concentrate. Therefore, the rigidity of the boundary portion can be effectively increased.

<Other Embodiments>

The technology described herein is not limited to the above embodiments explained in the above description and the drawings. The technology described herein may include the following embodiments.

(1) The door trim 10 may not have the door grip 20. As long as the ornament 50 is mounted to the front trim 30 and the rear trim 40, the boundary portion of the door trim 10 can be increased.

(2) The door grip 20 may be prepared separately from the front trim 30 and the rear trim 40, and mounted to the front trim 30 and the rear trim 40.

(3) The ornament 50 may not include the mounting portion that is mounted together with the front trim 30 and the rear trim 40 after aligned with the front trim 30 and the rear trim 40. The first insertion holes 52A may not be arranged in the areas corresponding to the base portions 20B of the door grip 20. As long as the ornament 50 is mounted to the front trim 30 and the rear trim 40, the rigidity of the boundary portion of the door trim 10 can be increased.

(4) The ornament 50 may not be covered with the skin 60. The surface of the main body 51 on the vehicle interior side without the skin may be defined as a design surface.

(5) The impact absorber 17 is not limited to the EA pad. A resin side impact absorber made of polypropylene resin or other types of side impact absorbers may be used.

(6) The number and the location of the impact absorber 17 can be altered as long as at least one impact absorber 17 is mounted across the front trim 30 and the rear trim 40.

(7) The method of fixing the impact absorber 17 to the front trim and the rear trim can be altered as long as the impact absorber 17 is fixed so as to extend from the front trim 30 to the rear trim 40 by some kind of the fixing means, such as welding or bolting.

What is claimed is:

1. A door trim for a vehicle, comprising:
   a front trim to be arranged closer to a front of the vehicle;
   a rear trim to be arranged closer to a rear of the vehicle; and
   at least one trim component mounted to the front trim and the rear trim so as to extend from the front trim to the rear trim across a boundary between the front trim and the rear trim, wherein
   an edge of the front trim connected to the rear trim is a diagonal edge such that a top edge of the front trim is shorter than a bottom edge of the front trim, and
   an edge of the rear trim connected to the diagonal edge of the front trim is a diagonal edge such that a top edge of the rear trim is longer than a bottom edge of the rear trim.

2. The door trim according to claim 1, wherein the trim component includes a front mounting portion for mounting a front portion of the trim component to the front trim and a rear mounting portion for mounting a rear portion of the trim component to the rear trim.

3. The door trim according to claim 2, wherein
   the front trim and the rear trim include overlapping portions arranged so as to overlap each other,
   the trim component includes a joint mounting portion in a portion corresponding to the overlapping portions, and
   the overlapping portions and the joint mounting portion are aligned so as to overlap and to be fixed to each other.

4. The door trim according to claim 1, wherein the front trim and the rear trim include door grip extending along the diagonal edges of the front trim and the rear trim, the door grip portions defining a door grip.

5. The door trim according to claim 4, wherein the trim component is an ornament arranged in areas of the front trim and the rear trim so as to overlap the door grip portions from a vehicle exterior side.

6. The door trim according to claim 5, wherein
the ornament includes a main body having a shallow tray-like shape, a projecting portion extending from a front edge of the main body, and flanges extending from the main body and the projecting portion, respectively,
the flanges extending from the main body include a front flange and a rear flange,
a front mounting portion and a rear mounting portion of the ornament are provided in the front flange and the rear flange, respectively,
a joint mounting portion of the ornament is provided in the flange extending from the projecting portion,
the rear trim has an ornament mounting hole in which the main body of the ornament is fitted and a rear ornament mount base at a rear edge of the ornament mounting hole,
the rear mounting portion of the ornament is held against the rear ornament mount base and fixed,
the front trim has a front ornament mount base,
the front mounting portion of the ornament is held against the front ornament mount base and fixed, and
the joint mounting portion of the ornament is held against the overlapping portion of the rear trim and fixed.

7. The door trim according to claim 6, wherein the joint mounting portion is arranged in a base portion of the door grip.

8. The door trim according to claim 5, wherein the front trim, the rear trim, and the ornament include armrest portions defining an armrest, the armrest including a step projecting to the vehicle interior side.

9. The door trim according to claim 8, wherein the ornament includes an arm placement portion within a portion attached to the rear trim, the arm placement portion being a portion of the armrest on which an occupant of the vehicle can place his or her arm.

10. The door trim according to claim 1, wherein the trim component is an impact absorber for absorbing a side impact on an occupant of the vehicle.

11. The door trim according to claim 1, wherein the at least one trim component includes a plurality of trim components that are an ornament and an impact absorber for absorbing a side impact on an occupant of the vehicle.

12. The door trim according to claim 11, wherein the front trim, the rear trim, and the ornament include armrest portions defining an armrest, the armrest including a step projecting to the vehicle interior side.

13. The door trim according to claim 12, wherein the ornament includes an arm placement portion within a portion attached to the rear trim, the arm placement portion being a portion of the armrest on which an occupant of the vehicle can place his or her arm.

14. The door trim according to claim 12, wherein
the armrest is arranged about a center of the door trim, and
the ornament and the impact absorber are arranged above and below the armrest, respectively.

15. The door trim according to claim 11, wherein
the front trim and the rear trim include door grip portions extending along the diagonal edges of the front trim and the rear trim and defining a door grip,
the ornament is arranged so as to overlap the door grip portions from a vehicle exterior side,
a joint mounting portion of the ornament is provided in a base portion of the door grip, and
the impact absorber is arranged in areas of the front trim and the rear trim in which the door grip portions are not arranged.

16. The door trim according to claim 15, wherein the front trim, the rear trim, and the ornament include armrest portions defining an armrest, the armrest including a step projecting to the vehicle interior side.

17. The door trim according to claim 16, wherein the ornament includes an arm placement portion within a portion attached to the rear trim, the arm placement portion being a portion of the armrest on which an occupant of the vehicle can place his or her arm.

18. The door trim according to claim 16, wherein
the armrest is arranged about a center of the door trim, and
the ornament and the impact absorber are arranged above and below the armrest, respectively.

19. The door trim according to claim 1, wherein the front trim includes a door pocket portion.

* * * * *